US010776539B2

United States Patent
Martin-Bragado

(10) Patent No.: US 10,776,539 B2
(45) Date of Patent: Sep. 15, 2020

(54) EFFICIENT LATTICE KINETIC MONTE CARLO SIMULATIONS FOR EPITAXIAL GROWTH

(71) Applicant: Synopsys, Inc., Mountain View, CA (US)

(72) Inventor: Ignacio Martin-Bragado, Mountain View, CA (US)

(73) Assignee: Synopsys, Inc., Mountain View, CA (US)

(*) Notice: Subject to any disclaimer, the term of this patent is extended or adjusted under 35 U.S.C. 154(b) by 449 days.

(21) Appl. No.: 15/829,560

(22) Filed: Dec. 1, 2017

(65) Prior Publication Data

US 2018/0157774 A1    Jun. 7, 2018

Related U.S. Application Data

(60) Provisional application No. 62/429,683, filed on Dec. 2, 2016.

(51) Int. Cl.
| | |
|---|---|
| *G06F 30/20* | (2020.01) |
| *G06F 17/18* | (2006.01) |
| *G06F 30/23* | (2020.01) |
| *G06F 30/392* | (2020.01) |
| *G06F 30/394* | (2020.01) |

(Continued)

(52) U.S. Cl.
CPC ............ *G06F 30/20* (2020.01); *G06F 17/18* (2013.01); *G06F 30/23* (2020.01); *G06F 30/3323* (2020.01); *G06F 30/392* (2020.01); *G06F 30/394* (2020.01); *G06F 2111/08* (2020.01); *G06F 2111/10* (2020.01)

(58) Field of Classification Search
CPC ........ G06F 30/20; G06F 17/18; G06F 30/392; G06F 30/394; G06F 2111/08; G06F 30/23; G06F 30/3323; G06F 2111/10
See application file for complete search history.

(56) References Cited

U.S. PATENT DOCUMENTS

| | | |
|---|---|---|
| 8,959,464 B2 | 2/2015 | Greiner et al. |
| 9,317,632 B2 | 4/2016 | Faken et al. |
| 9,852,242 B2 | 12/2017 | Moroz et al. |

OTHER PUBLICATIONS

Deretzis, I., and A. La Magna. "Simulating structural transitions with kinetic Monte Carlo: The case of epitaxial graphene on SiC." Physical Review E 93, No. 3 (2016): 033304. (Year: 2016).*

(Continued)

*Primary Examiner* — Rehana Perveen
*Assistant Examiner* — Chuen-Meei Gan
(74) *Attorney, Agent, or Firm* — Haynes Beffel & Wolfeld LLP; Warren S. Wolfeld; Andrew L. Dunlap

(57) ABSTRACT

A method for simulating an epitaxial process in a body having a crystal lattice structure. Roughly described, an enlarged version of the crystal lattice structure is formed, having a lattice constant increased by a lattice enlargement factor N>1. The subject fabrication process is simulated by a Lattice Kinetic Monte Carlo algorithm in which various factors have been scaled in accordance with N. The simulation speed increases by a factor around $N^3$, without significantly degrading the accuracy of the resulting simulated structure. The simulated epitaxial process can later be performed on a physical crystalline body.

21 Claims, 8 Drawing Sheets
(2 of 8 Drawing Sheet(s) Filed in Color)

(51) Int. Cl.
 G06F 30/3323 (2020.01)
 G06F 111/08 (2020.01)
 G06F 111/10 (2020.01)

(56) References Cited

OTHER PUBLICATIONS

Martin-Bragado, Ignacio, and Victor Moroz. "Modeling of {311} facets using a lattice kinetic Monte Carlo three-dimensional model for selective epitaxial growth of silicon." Applied Physics Letters 98, No. 15 (2011): 153111. (Year: 2011).*

Zographos, Nikolas, Christoph Zechner, Ignacio Martin-Bragado, Kyuho Lee, and Yong-Seog Oh. "Multiscale modeling of doping processes in advanced semiconductor devices." Materials Science in Semiconductor Processing 62 (2017): 49-61. (Year: 2017).*

Balbuena, Juan Pablo, and Ignacio Martin-Bragado. "Lattice kinetic Monte Carlo simulation of epitaxial growth of silicon thin films in H2/SiH4 chemical vapor deposition systems." Thin Solid Films 634 (2017): 121-133. (Year: 2017).*

Biehl, Michael. "Lattice gas models and Kinetic Monte Carlo simulations of epitaxial growth." in Multiscale Modeling in Epitaxial Growth, pp. 3-18. Birkhäuser Basel, 2005. (Year: 2005).*

Prieto-Depedro, M., I. Martin-Bragado, and J. Segurado. "An atomistically informed kinetic Monte Carlo model of grain boundary motion coupled to shear deformation." International Journal of Plasticity 68 (2015): 98-110. (Year: 2015).*

Aviziotis, Ioannis G., Nikolaos Cheimarios, Thomas Duguet, Constantin Vahlas, and Andreas G. Boudouvis. "Multiscale modeling and experimental analysis of chemical vapor deposited aluminum films: Linking reactor operating conditions with roughness evolution." Chemical Engineering Science 155 (2016): (Year: 2016).*

Voter, "Introduction to the Kinetic Monte Carlo Method," in Radiation Effects in Solids, Springer, NATO Publishing Unit, 2007, pp. 1-23.

Martin-Bragado et al., "Modeling of {311} facets using a lattice kinetic Monte Carlo three-dimensional model for selective epitaxial growth of silicon," Applied Physics Letters 98, No. 15, 2011, 3 pages.

Gillespie, "A general method for numerically simulating the stochastic time evolution of coupled chemical reactions," Journal of computational physics 22.4 (1976): 403-434.

Martin-Bragado et al. "MMonCa: An Object Kinetic Monte Carlo simulator for damage irradiation evolution and defect diffusion," Computer Physics Communications 184.12 (2013): 2703-2710.

Chen et al., "A new kinetic lattice Monte Carlo modeling framework for the source-drain selective epitaxial growth process," In Simulation of Semiconductor Processes and Devices (SISPAD), 2013 International Conference on, IEEE, 2013, pp. 9-12.

Martin-Bragado et al., "Facet formation during solid phase epitaxy regrowth: A lattice kinetic Monte Carlo model," Applied Physics Letters 95, No. 12, 2009, 3 pages.

* cited by examiner

EFFICIENT LATTICE KINETIC MONTE CARLO SIMULATIONS FOR EPITAXIAL GROWTH

CROSS-REFERENCE TO OTHER APPLICATIONS

Applicant hereby claims the benefit under 35 U.S.C. 119(e) of U.S. provisional application No. 62/429,683, filed 2 Dec. 2016. The provisional application is hereby incorporated by reference herein for its teachings.

Applicant also incorporates by reference herein for its teachings U.S. application Ser. No. 14/479,070, filed 5 Sep. 2014.

BACKGROUND

This invention relates to methods for modeling temporal processes in a body of material in computer aided design (CAD) and electronic design automation (EDA) systems. For example it may be used to model semiconductor fabrication process steps such as epitaxial growth in crystalline material structures, which are later used to fabricate integrated circuit devices.

Various methods can be used for modeling temporal processes in a body of material. Processes involving particle movement or chemical reactions often are best modeled using discrete time probability functions. The Kinetic Monte Carlo (KMC) method is a Monte Carlo computer simulation method that simulates time evolution of certain processes occurring at a known rate, modeled by such discrete time probability functions. See A. F. Voter, Introduction to the Kinetic Monte Carlo Method, in Radiation Effects in Solids, edited by K. E. Sickafus, E. A. Kotomin and B. P. Uberuaga (Springer, NATO Publishing Unit, Dordrecht, The Netherlands, 2007) pp. 1-23, incorporated by reference herein.

In a KMC method, events are modeled as having a predefined probability of occurring per unit time. For modeling a dopant diffusion process, for example, there is a known probability at which a dopant atom will jump in each direction during a particular time step. The probability increases with increasing temperature. The probability per time step, which can also be thought of as a frequency of occurrence v, is given by:

$$v = v_0 \cdot \exp\left(\frac{-E_a}{k_B T}\right),$$

where
- $v_0$ is a pre-factor that is determined by the properties of a material where the event is occurring and the properties of the particle under consideration;
- $E_a$ is an activation energy of the event, such as the energy barrier for the particle jumping from one location to the next;
- $k_B$ is Boltzmann's constant, and
- T is temperature Thus to model a process in which events occur randomly, with a frequency that depends on the values of certain properties of the particle of interest and properties of the local material, an embodiment might use discrete time probability functions at each of the nodes, with the parameters of the node function ($v_0$, $E_a$ and T in the above example) assigned values based on the material and conditions extant at each grid node. The time step for the simulation is typically chosen based on the time scale at which the event is likely to occur. If multiple concurrent random processes are to be modeled, then the time step for the simulation is typically chosen based on the time scale at which the most frequent event is likely to occur.

A computer simulation is a simulation, run on a single computer, or a network of computers, to reproduce behavior of a physical system. The simulation applies a model to simulate the system. Computer simulations have become a useful part of mathematical modeling of many natural systems in physics (computational physics), electronics, chemistry, and engineering. Simulation of a system is represented as the computer execution of the system's model. Computer simulation may be used to explore and gain insights into new technology and to estimate the performance or other behaviors of complex systems.

Epitaxy refers to the formation of a crystalline overlayer on a crystalline substrate. The overlayer is called an epitaxial film or epitaxial layer. For most technological applications, it is desired that the deposited material form an epitaxial layer that has one well-defined crystalline orientation with respect to the substrate crystal structure (i.e., single-domain epitaxy).

Epitaxy is used in nanotechnology, in semiconductor fabrication, and to create monolayer and multilayer films on crystalline surfaces. Epitaxy is particularly useful for compound-material semiconductors such as gallium arsenide transistors. Epitaxial silicon is often formed using vapor-phase epitaxy, a type of chemical vapor deposition. Molecular-beam and liquid-phase epitaxy are also used, for example for compound semiconductors. Solid-phase epitaxy is used is used in applications such as crystal-damage healing.

Epitaxial films may be grown from gaseous or liquid precursors. Because the substrate acts as a seed crystal, the deposited film may orient into one of a defined set of discrete orientations with respect to the substrate crystal. This is referred to as epitaxial growth. If the overlayer either forms an orientation that is not one of a defined set of discrete orientations with respect to the substrate, or does not form an ordered overlayer, it is termed non-epitaxial growth. If an epitaxial film is deposited on a substrate of the same composition, the process is called homoepitaxy; otherwise it is called heteroepitaxy.

Simulation of epitaxial growth is of critical importance for new microelectronic devices, especially for FinFETS and FinFET derived technologies (e.g., horizontal nanowires and "Gate All Around" devices), as well as new or revised semiconductor fabrication processes. Continuum models for epitaxial growth, based on finite element calculations or level-set algorithms, are not good at predicting the correct growth shapes, mostly because they tend to turn and smooth the corners, and also because epitaxial growth is very sensitive to orientation. Lattice Kinetic Monte Carlo (LKMC) models may be utilized [1, 2] but in some cases they can be slow to execute. Faster simulation using LKMC models would provide an improved solution for epitaxial growth problems.

Regular Lattice KMC simulation (i.e., mapping atoms one-to-one with the material density) is a conventional process to simulate epitaxy. In particular, Synopsys Sentaurus Process KMC and the Open Source MMonCa [4] implement conventional solutions to this same problem. Both are incorporated by reference herein.

The following background reference documents are incorporated by reference herein:

[1] I. Martin-Bragado and V. Moroz. Appl. Phys. Lett. 95, 123123 (2009)

[2] Chen et al. SISPAD, Glasgow, 2013, pp. 9-12.
[3] D. T. Gillespie, J. Comput Phys. 22 (1976) 403.
[4] I. Martin-Bragado et al. Computer Physics Communications 184 (2013) 2703-2710.

SUMMARY

Disclosed herein are processes for faster LKMC model simulations. The processes are described in particular for simulation of epitaxial growth, but generally apply to simulation of any type of physical event which occurs with an average frequency at various lattice nodes. Examples of other physical events that may be simulated using the described processes include crystallization of amorphous material at the amorphous/crystalline interface, growth of polycrystalline silicon, microstructure evolution in metals, and similar events.

Embodiments of the invention can improve memory utilization and CPU performance with little trade-off for accuracy, with results comparable to conventional LKMC simulations. The increased performance permits simulation of bigger, more realistic and comprehensive layouts. The calibration procedures for conventional LKMC may be utilized with the disclosed processes with little or no change.

Roughly described, aspects of the invention involve representing an enlarged version of the crystal lattice structure (or portion thereof) having a lattice constant increased by a lattice enlargement factor N>1, assigning exactly one enlarged simulated particle of the body (or an empty state) to each of a plurality of the nodes in the enlarged lattice structure, and simulating the subject fabrication process by a Lattice Kinetic Monte Carlo algorithm in which various factors have been scaled in accordance with N. As a result, the simulation speed increases correspondingly by a factor around $N^3$, without significantly degrading the accuracy of the resulting simulated structure. The simulated epitaxial process can later be performed on a physical crystalline body.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be described with respect to specific embodiments thereof, and reference will be made to the drawings, in which.

DETAILED DESCRIPTION

Figure 1:
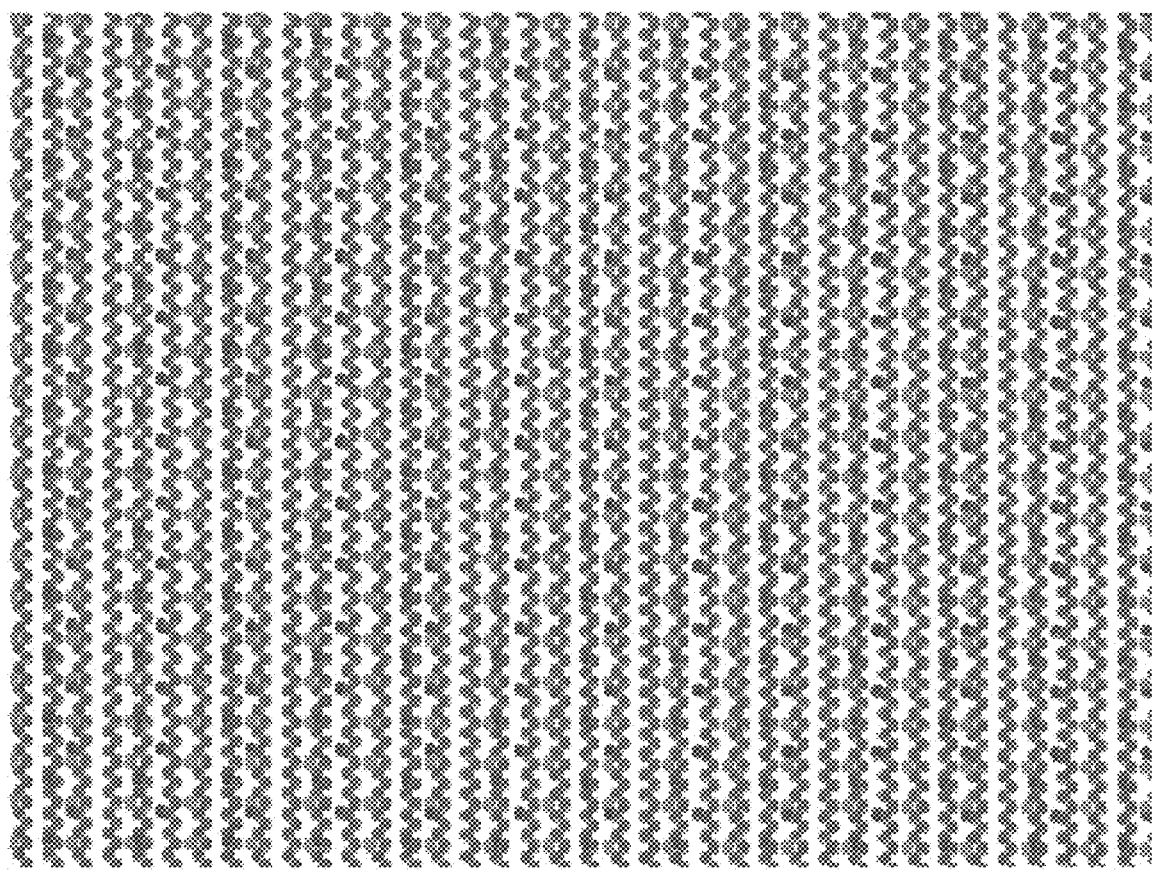
FIG. 1 illustrates a diamond lattice structure according to one embodiment.

Conventional models for simulating epitaxial growth (e.g., References [1, 2]) represent the growth material atomistically and reproduce every single atom in the sample following the crystalline structure. That is, a realistic lattice structure is chosen (such as diamond crystal, for silicon or germanium materials), and an atom is placed at each node in the lattice. Then, the models assign different rates to the incorporation of new atoms or to surface reactions in general, following an Arrhenius function:

$$v = v_0 \cdot \exp\left(\frac{-E_a}{k_B T}\right), \quad \text{(Equation 1)}$$

where v is the frequency of the event, $v_0$ is a prefactor, $E_a$ is an activation energy $k_B$ is Boltzmann's constant, and T is temperature. For example, v may be the per-site frequency at which a gaseous state atom deposits as solid at a particular empty crystal site in a gaseous phase epitaxial growth process, or the per-site frequency at which a liquid state atom attaches at a particular empty crystal site in a liquid phase epitaxial growth process, or the per-site frequency at which an amorphous state atom deposits as solid at a particular empty site in an epitaxial re-crystallization process. The activation energy and/or the prefactor, depends on several factors, but the most important ones are the states of the first, second and third neighbor nodes. Crystal lattice cells are repetitive in multiple directions, and from the point of view of a subject one of the nodes, the nearby nodes tend to be grouped into concentric spheres at different radii. The "first neighbors" are all the nodes in the sphere whose radius is approximately equal to the distance from the subject node to its nearest neighboring node. The "second neighbors" are all the nodes in the sphere whose radius is approximately equal to the distance from the subject node to the node nearest the subject node but beyond the first neighbor sphere. The "third neighbors" are all the nodes in the sphere whose radius is approximately equal to the distance from the subject node to the node nearest the subject node but beyond the second neighbor sphere, and so on. The activation energy and/or the prefactor depends mostly on the state of the first neighbor nodes, secondarily on the states of the second neighbor nodes, and tertiarily on the state of the third neighbor nodes.

Disclosed herein are embodiments of an effective model (also called an enlarged model) created by simulating atoms that are "bigger" than real ones, occupying more volume, but simply assuming that the lattice parameter is bigger and increasing also linearly the radii that define first, second and third neighbors, such that the local topologies remain the same as they were in the one-to-one mapping paradigm. Then, equation (1) can be used similarly adapting the parameters to the new paradigm. In particular, to properly account for the time, scaling the prefactors by the same quantity as the scaled lattice typically is sufficient.

As a particular example, if the lattice parameter is increased by a factor N>1, then the Arrhenius function prefactor $v_0$ should be reduced by a factor approximately equal to 1/N. A reduction factor of 1/N is a first approximation adequate for most purposes. If a more accurate factor is needed, then the effect of different facets can be taken into account to modify the factor. Note that no similar adaptation is needed for the value of $E_a$.

For a given volume of deposited material, increasing the lattice parameter by a factor N will decrease the number of "enlarged particles" deposited by roughly $N^3$: the number of sites on the surface at which an enlarged particle is deposited is roughly $1/N^2$ times the number of sites on the surface at which a real particle would be deposited, and the number of particles of thickness of the deposited material is roughly 1/N times the number of real particles that would be needed by the deposition of real particles. The simulation speed also increases correspondingly by a factor around $N^3$.

A drawback of this method is reduced resolution of the surfaces by a factor of roughly N, and consequently, a decreased resolution in the surface roughness. However, for many purposes the reduced surface resolution is acceptable.

The atomistic models proposed [1,2] for LKMC maps the material to simulate into a simulation by representing all atoms and establishing the rules (frequencies) for the next atom to be deposited on the surface. The disclosed processes break this correspondence and represent the material with "enlarged" particles that do not actually correspond to real atoms, but serve as a grid to represent substantially approximate regions of atoms on the growing surface.

Because the models have the correct topology to be predictive, i.e., the correct number of first, second and their neighbors and the crystalline structure, the disclosed processes utilize an increased lattice and neighbor distance, and reduce the growth parameters accordingly to reproduce the same physical process with a significantly decreased number of "particles" to simulate.

FIG. 1 illustrates a diamond lattice structure 100 of Si, Ge, or other diamond lattice solids according to one embodiment. The view of FIG. 1 is a normal projection of the lattice onto a plane parallel to a [100] surface. The blue dots represent centerpoints of the original 1× lattice (N=1). The green dots represent centerpoints of a 2× lattice structure, which is enlarged by N=2. The red dots represent centerpoints of a 3× lattice structure, which is enlarged by N=3. The 2× lattice structure has one green particle for every 8 original (blue) particles, and the 3× lattice structure has one red particle for every 27 original (blue) particles.

Figure 2:
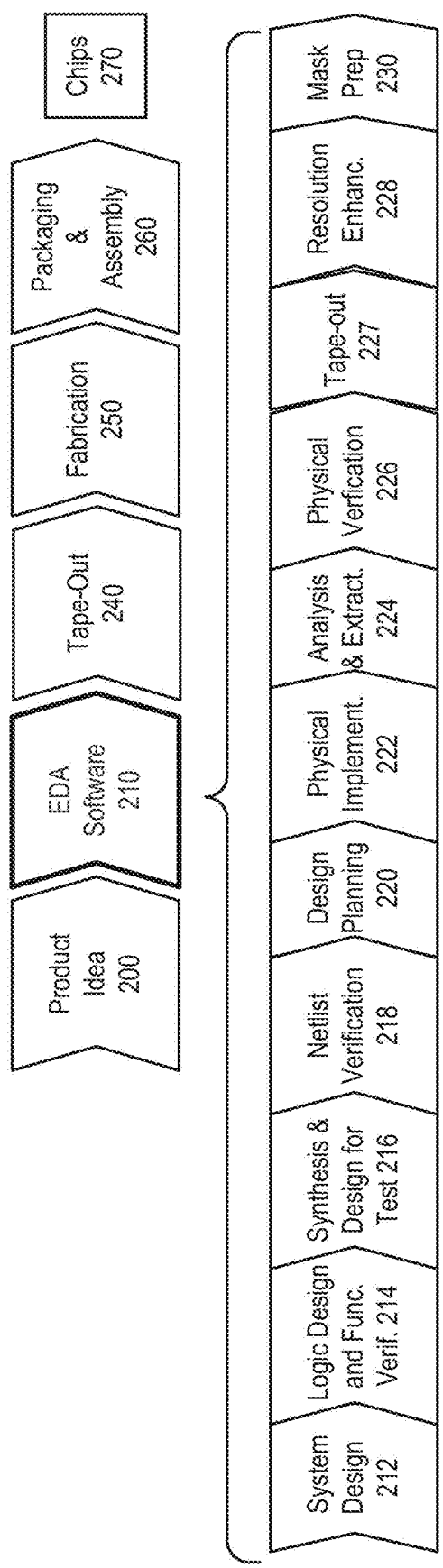
FIG. 2 shows a simplified representation of an illustrative integrated circuit design flow incorporating features of the technology.

FIG. 2 shows a simplified representation of an illustrative integrated circuit design flow incorporating features of the technology. At a high level, the process starts with the product idea (step 200) and is realized in an EDA (Electronic Design Automation) software design process (step 210). When the design is finalized, it can be taped-out (step 240). After tape out, the fabrication process (step 250) and packaging and assembly processes (step 260) occur resulting, ultimately, in finished integrated circuit chips (result 270).

The EDA software design process (step 210) is actually composed of a number of steps 212-230, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 210) will now be provided.

System design (step 212): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 214): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 216): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, Tetramax, and DesignWare® products.

Netlist verification (step 218): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 220): Here, an overall floor plan for the chip is constructed and analyzed for timing and top-level routing. Example EDA software products from Synopsys, Inc. that can be used at this step include Astro and IC Compiler products.

Physical implementation (step 222): The placement (positioning of circuit elements) and routing (connection of the same) occurs at this step. Example EDA software products from Synopsys, Inc. that can be used at this step include the Astro and IC Compiler products.

Analysis and extraction (step 224): At this step, the circuit function is verified at a transistor level, this in turn permits what-if refinement. Example EDA software products from Synopsys, Inc. that can be used at this step include AstroRail, PrimeRail, Primetime, and Star RC/XT products.

Physical verification (step 226): At this step various checking functions are performed to ensure correctness for: manufacturing, electrical issues, lithographic issues, and circuitry. Example EDA software products from Synopsys, Inc. that can be used at this step include the Hercules product.

Tape-out (step 227): This step provides the "tape out" data for production of masks for lithographic use to produce finished chips. Example EDA software products from Synopsys, Inc. that can be used at this step include the CATS® family of products.

Resolution enhancement (step 228): This step involves geometric manipulations of the layout to improve manufacturability of the design. Example EDA software products from Synopsys, Inc. that can be used at this step include Proteus, ProteusAF, and PSMGen products.

Mask data preparation (step 230): This step provides the "tape-out" data for production of masks for lithographic use to produce finished chips. Example EDA software products from Synopsys, Inc. that can be used at this step include the CATS® family of products.

A typical integrated circuit manufacturing flow also includes a related flow, as follows:

(1) Develop individual process steps for manufacturing the integrated circuit. This can be modeled with the Synopsys tools "Sentaurus Process", "Sentaurus Topography", and "Sentaurus Lithography," which may use aspects of the invention as described herein. The input information here includes process conditions like temperature, reactor ambient, implant energy, etc. The output information is the changes in geometry or doping profiles or stress distribution. Aspects of the invention can be used in this step of the manufacturing flow.

(2) Integrate the individual process steps into the complete process flow. This can be modeled with the Synopsys tool "Sentaurus Process". The input information here includes the collection of the process steps in the appropriate sequence. The output includes the geometry, the doping profiles, and the stress distribution for the transistors and the space in between the transistors. Aspects of the invention can be used also in this step of the manufacturing flow.

(3) Analyze performance of the transistor manufactured with this process flow. This can be done with the Synopsys tool "Sentaurus Device". The input information here includes the output of step (2) and the biases applied to transistor terminals. The output information includes the currents and capacitances of the transistors for each bias combination. Aspects of the invention can be used also in this step of the manufacturing flow.

The output information developed in step (3) characterizes the transistors made using the process, and the characteristics are then provided to circuit simulators such as HSPICE in order to permit a designer to analyze circuit designs at a transistor level. By analyzing the circuit at to transistor level, the designer is able to develop better designs.

(4) If necessary, modify the process steps and the process flow to achieve the desired transistor performance. This can be done iteratively by using the Synopsys tools mentioned above.

Once the process flow is ready, it can be used for manufacturing multiple circuit designs coming from various designers in various companies. The EDA flow 212-230 will be used by such designers. The parallel flow described here can be used for example at a foundry to develop a process flow that can be used to manufacture designs coming from the designers. A combination of the process flow and the masks made from step 230 are used to manufacture any particular circuit. If the designers are at a different company, e.g. a fabless company, then usually it is the foundry that performs this parallel process flow whereas the process steps of FIG. 2 are performed typically by the fabless company. If the integrated circuit is manufactured at an IDM (integrated device manufacturer) company instead of the combination of a fabless company and a foundry, then both parallel flows described above are done at the same IDM company.

There is also a bridge between these tools and the 212-230 EDA tools. The bridge is a Synopsys tool "Seismos" that applies compact proximity models for particular circuit design and layout to obtain netlist with instance parameters for each individual transistor in the circuit as a function of its neighborhood and stress, including material conversion stress. This netlist is used in the analysis step 224.

Figure 3:
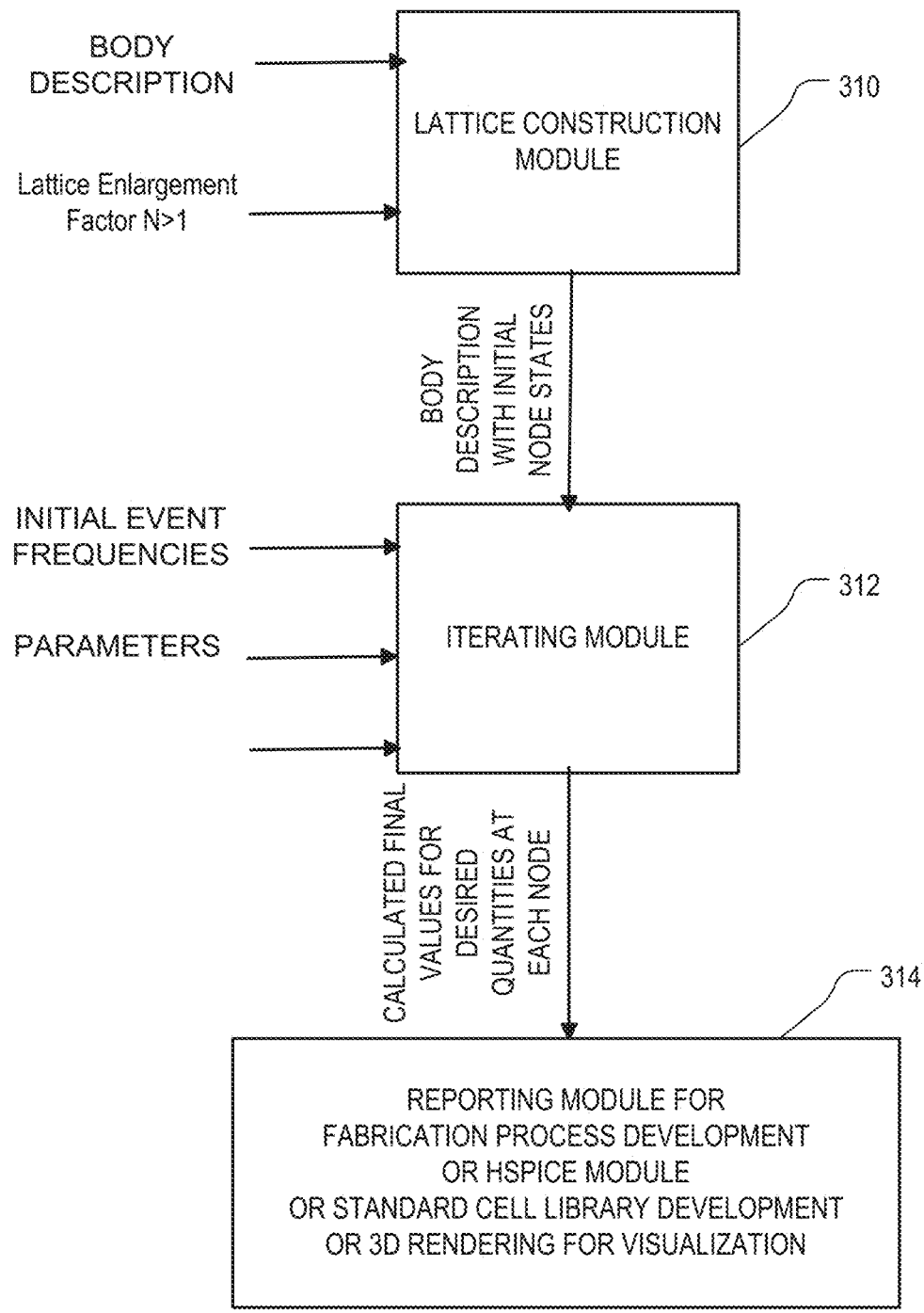
FIG. 3 illustrates an overall system structure implementing aspects of the invention in the related flow.

FIG. 3 illustrates an overall system structure implementing aspects of the invention in the related flow. It can be used in several of the steps of the related flow. The system includes a lattice constructor module 310, which receives, from a user or from other modules, various parameters for the analysis and a description of the body to be modeled in its initial state. The received parameters include an indication of the lattice type (e.g. diamond cubic), as well as a lattice enlargement factor N, for use in speeding up the subsequent LKMC iterative analysis. In an aspect of the invention, N>1. The lattice constructor module 310 develops an initial lattice structure of the type specified (e.g. diamond cubic), using a lattice constant which is given by the lattice constant of a real crystal of the type specified, multiplied by N. If the lattice constant is different in different dimensions, then each of the lattice constants are provided, and each is multiplied by N. Notationally, the real crystal is said herein to have a set of three lattice constants $L_d$, one lattice constant for each of the three XYZ dimensions d. The value of d can be considered to range from 0-2. The lattice constant of the enlarged lattice in each dimension d is given by $N*L_d$. The lattice constant (or constants) for many types of crystals used for integrated circuit devices is (are) known physical quantities, or can be determined by any number of well-known methods. For the remainder of this description, an embodiment is assumed in which the lattice constant is the same in all dimensions (such as is the case for a diamond cubic lattice), and is referred to as either L or $L_0$. The lattice constant of the constructed enlarged lattice structure is then given by $N*L$. The enlarged lattice developed by the lattice constructor module 310 maintains the geometry of the corresponding real crystal, but on the larger scale.

The lattice constructor module 310 proceeds to assign an initial state to each of the nodes in the enlarged lattice. If the starting structure is a single crystal silicon substrate, for example, the lattice constructor module defines a diamond cubic lattice and assigns all nodes below the surface has having a state indicating that the node holds a silicon atom. One or more levels of nodes above the surface may be assigned an initial state indicating 'empty'. The body represented by the lattice could be only a portion of the overall structure since it is known a priori that nodes well below the surface will not undergo any state transitions during the process step to be simulated. Alternatively, the lattice can be constructed to represent the entire body, and the frequency of state transitions for nodes well below the surface can be assigned a fixed value of zero.

Lattice constructor module 310 outputs a description of the body in the form of a data structure describing the enlarged lattice, with initial states assigned to each node. The output is in a predefined format. In one embodiment the output is written to a non-transitory computer readable medium such as a disk drive or computer memory.

The output of lattice constructor module 310 is provided to an iterating module 312, which may include a Technology Computer Aided Design (TCAD) module, such as Sentaurus Process, Sentaurus Topography, Sentaurus Lithography, or Sentaurus Device, all available from Synopsys, Inc., Mountain View, Calif. Different ones of these tools would be used as iterating module 312, depending on the particular type of temporal process to be modeled. The iterating module 312 models the behavior of a material structure during a time-varying process, by simulating the behavior on a computer system. A user also provides the form of the node equations (e.g. an Arrhenius function) to iterating module 312, and base values for various parameters used by the node equations. The user also may provide time step parameters in some embodiments (such as the duration of each time step and/or a maximum number of time steps to calculate).

Iterating module 312 provides as output an indication of the final structure of the body, as calculated by the simulation. The final structure may be represented by the final state of each node in the lattice data structure. Like the output of lattice constructor module 310, the output of iterating module 312 is provided in a predefined format. The output is reported to a user by a reporting module 314. In one embodiment the output is written to a non-transitory computer readable medium such as a disk drive or computer memory, and in a further embodiment the output can be provided to a visualization module which presents the distribution of node states across the body in a visual form which simplifies user interpretation of the results.

The results are then used, in various embodiments, for a variety of real world aspects of building or improving integrated circuit devices. In one embodiment, for example, the results are used to develop or improve a fabrication process flow that can be used to manufacture designs. A combination of the process flow and the masks made from step 1130 are used to manufacture any particular circuit. In another embodiment the results are used to characterize or improve transistors and other devices. In other embodiments the results are used to develop HSPICE models of integrated circuit devices, in order to enable designers to develop better circuit designs and layouts. In yet other embodiments the results are used to improve process flow to achieve the desired transistor performance. Thus the numerical values obtained by the methods and systems described herein are used for real world technological development or implementation of semiconductor manufacturing processes or circuit designs.

Figure 4:
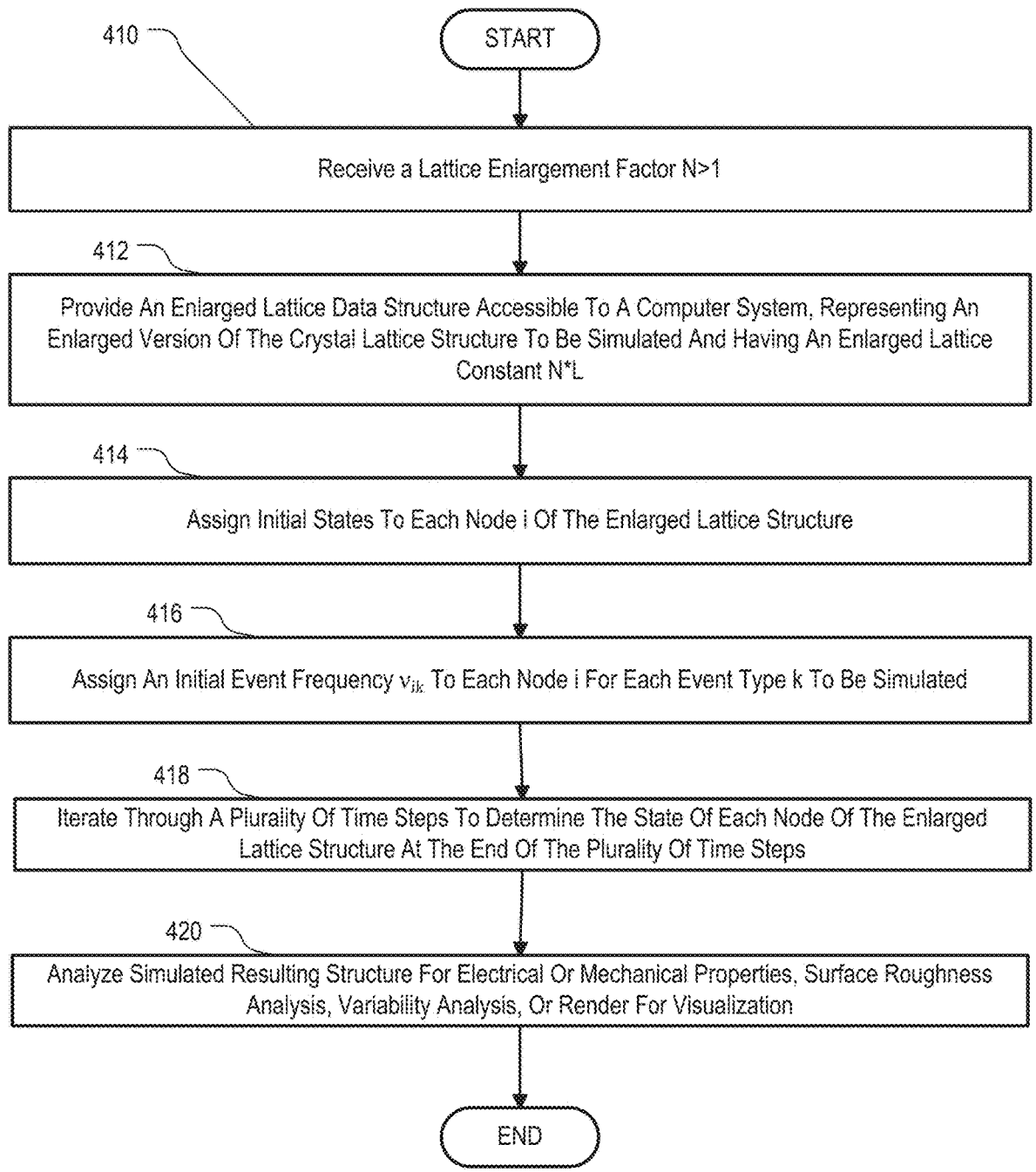
FIG. 4 is a flow chart illustrating the operation of an embodiment of FIG. 3, for the simulation of an epitaxial growth process.

FIG. 4 is a flow chart illustrating the operation of an embodiment of FIG. 3, for the simulation of an epitaxial growth process. In FIG. 4, steps 410-414 are performed by the lattice constructor module 310 and steps 416-418 are performed by the iterating module 312. The logic of FIG. 4 can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart describes logic that can be implemented in hardware or in software running on one or more computing processes executing on one or more computer systems. In one embodiment, each step of the flow chart illustrates the function of a separate module of software. In another embodiment, the logic of the step is performed by software code routines which are distributed throughout more than one module. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that in a specific embodiment, numerous additional steps for accomplishing other functions for that embodiment can be performed before, after and between those steps shown.

Referring to FIG. 4, in step 410, one of the parameters received by the lattice constructor module 310 is the lattice enlargement factor N. In the embodiment of FIG. 4, N>1. In step 412, the lattice constructor module 310 prepares an enlarged lattice data structure accessible to the computer system, representing an enlarged version of the crystal lattice structure to be simulated (or portion thereof) and having an enlarged lattice constant N*L. In one embodiment the portion of the lattice to be simulated (and hence the constructed lattice structure) can extend downward (into the starting crystal body) from the starting surface by only a few (enlarged) crystal lattice cells because lattice nodes below that level will not be changing states during the simulated process, and because their state will not affect the state transition frequencies at the surface. For example, if the value of the Arrhenius function prefactors for a particular node will be determined in dependence upon the state of first, second and third radius neighbor nodes, and not any nodes beyond the third neighbors, then the crystal lattice constructed by the lattice constructor module 310 need not extend below the surface beyond the distance of the third neighbors. In a different embodiment, more of the body can be represented in the data structure, but transition rates are assigned to zero for nodes whose state will not change and whose state will not affect state transition frequencies at the surface.

Also, in one embodiment the enlarged lattice should include "empty" state nodes above the interface surface, so as to accept changes to a "filled" state when an atom deposits there.

In step 414 the lattice constructor module 310 assign initial states to each node i of the enlarged lattice structure constructed in step 412. The state is pre-specified as one of several possible states that a node may have before, during and after the simulated process step. If the simulation is for vapor phase epitaxial growth of silicon on a silicon substrate, for example, each node of the enlarged lattice structure may have either of two states: "empty" or "silicon atom". If the simulation is for vapor phase epitaxial growth of SiGe on a silicon substrate, then each node of the enlarged lattice structure may have any of three states: "empty", "silicon atom", or "germanium atom". Other examples will be apparent to the reader.

In step 416, the iterating module 312 assigns k initial event frequencies $v_{ik}$ to each node i of the enlarged lattice structure, one for each event type k to be simulated. For epitaxial growth and etching embodiments described herein, the event types are state transitions, and for pure epitaxial growth of silicon on silicon, there may be only one event type to simulate: transition of a node from state "empty" to state "silicon". But if the process step involves epitaxial growth of SiGe on silicon, then there might be two event types to simulate: transition of a node from state "empty" to state "silicon", and transition of a node from state "empty" to state "germanium". If the process also involves etch, then other event types to be simulated would include transitions from each of the possible filled state, to the "empty" state. Again, other examples will be apparent to the reader.

It can be seen that the event frequencies $v_{ik}$ at each node i will depend on the particular event type k. It will also likely depend on the particular node i, because the prior state of node i dictates for example that certain transitions will never occur (for example a transition from 'silicon' to 'empty', when the prior state of the node is 'germanium'). It will likely depend on the particular node i, also because certain prefactors and energies of the Arrhenius function depend on the prior states of neighboring nodes.

It is well known how to calculate the prefactors for the Arrhenius function as applied to a realistic, un-enlarged crystal lattice. Typically they are determined from simulations, from experimental results, or by calibration, and provided to conventional KMC systems in the form of a prefactor lookup table. The prefactor lookup table indicates what the value of the prefactor $v_0$ is for a particular node, for each possible combination of nodes states in the nearest neighbors to the particular node. A separate column may be provided in the table to indicate the prefactor value for each type of state transition being modeled. For embodiments herein, where N>1, prefactor $v_0$ should then be reduced by a factor approximately equal to 1/N. Reduction by a factor 1/N is a first approximation adequate for most purposes. If a more accurate factor is needed, then the effect of different facets can be taken into account to modify the factor. Usually, the activation energy $E_a$ should remain the same.

Thus in order to determine an initial frequency $v_{ik}$ for a particular combination of a node i of the enlarged lattice structure and a state transition type k, the system first determines the configuration of states at the neighbor nodes to node i. It then consults the above prefactor lookup table and obtains the prefactor value for that configuration, as appropriate for an un-enlarged lattice structure. The system then divides that number by N.

Note that the prefactor lookup table can have different levels of granularity in different embodiments. If great accuracy is not required, then a prefactor lookup table can be used which contains entries only for the various possible configurations of the first neighbors. If more accuracy is required, then a prefactor lookup table can be used which contains entries for the various possible configurations of the both the first and second neighbors; the states of the third and higher neighbor nodes are ignored. Even greater accuracy can be provided if the prefactor lookup table contains entries for all the various possible configurations of the first, second and third neighbors, and so on.

Note that whereas the Arrhenius function is typically used for estimating transition rates in etch and epitaxial growth processes, other functions may be used that are more accurate for other types of processes. For example, if the process to be simulated does not depend on the particular node or the event type, then a simple, constant function can be used as the transition frequency for all nodes and event types. As another example, if the process to be simulated depends on the total number of nodes in the system which have a particular state, and that number of nodes changes over time, then the transition frequency function for all nodes can be merely a function of the total number of nodes in the system which have a particular state. This might be the case where the process to be simulated is radioactive decay, for example, and the event at each time step is the transition of a node from one state indicting a parent radionuclide to another state indicating its daughter radionuclide. As yet another example, the system can use the transition frequency given by Karl Ferdinant Herzfeld Full Transition State Theory. The reader will be familiar with other functions, as well, that might be used for estimating transition rates at each node for various processes of interest.

In step 418 the iterating module 312 iterates through a plurality of time steps to determine the state of each node of the enlarged lattice structure after the iteration is complete. This step is described in more detail with respect to FIG. 5. As mentioned with respect to FIG. 3, the resulting enlarged structure is then analyzed or rendered for visualization (step 420). For visualization, it is not necessary to convert the enlarged lattice structure back to un-enlarged form, since the only difference would be in scale. Geometry and topology would not be affected by such conversion. Visualization can be accomplished with any atomistic package that accepts XYZ "atomic" coordinates, such as xmol, jmol, ovito, or Virtual Nano Lab (available from Synopsys, Inc.). For other types of analysis, the enlarged structure may need to be converted to a regular mesh, by tetrahedrons, uniform tensor mesh, or whatever representation is required by the analysis package. Examples of types of analysis that can be performed after an epitaxial growth simulation using aspects of the invention include, among other things, analysis of the resulting structure for its electrical or mechanical properties, or its surface roughness. Variability analysis can be performed by repeating the simulation multiple times using different seeds for the random numbers used in step 510 (FIG. 5) and/or 620 (FIG. 6).

Figure 5:
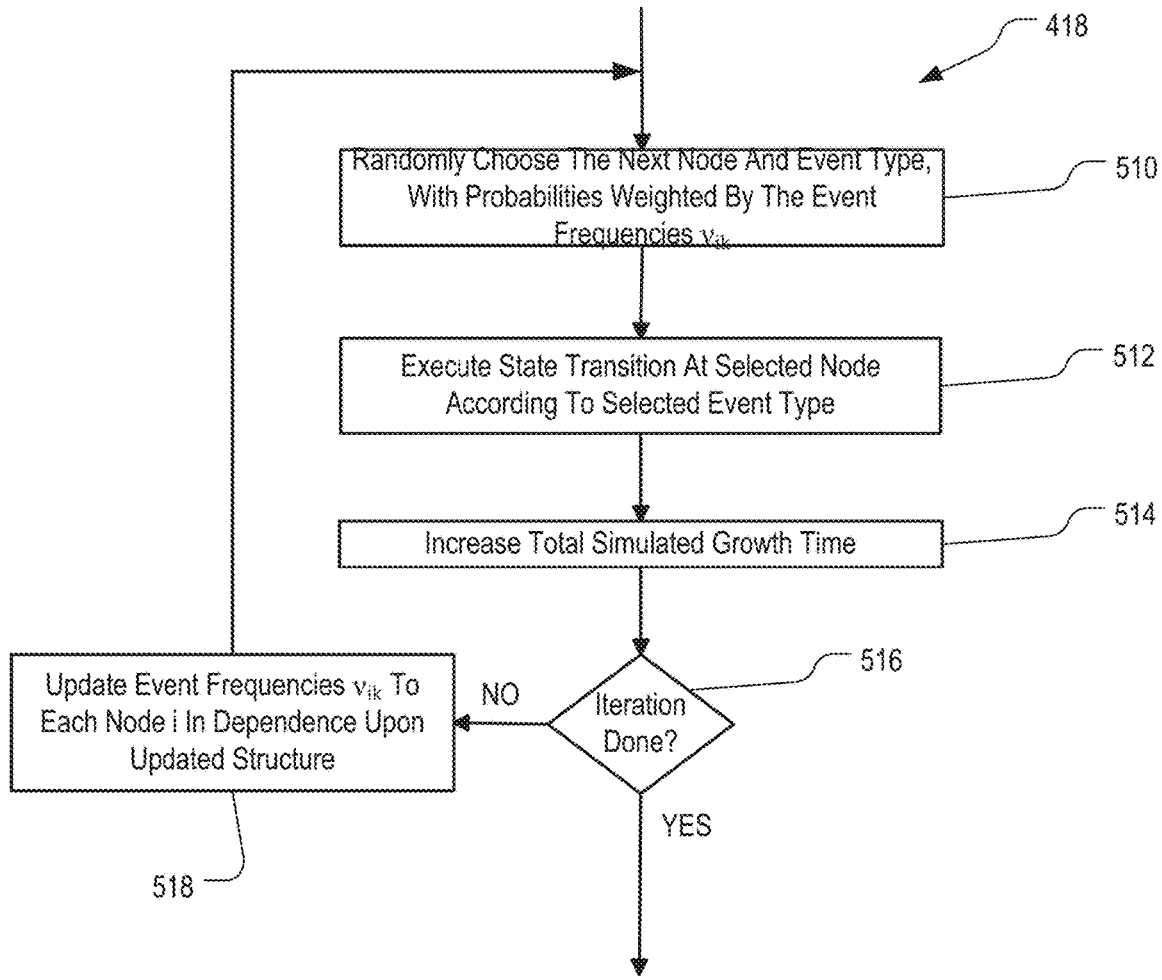
FIG. 5 is a flow chart detail of the iterating step 418 in FIG. 4 in one embodiment.
Figure 6:
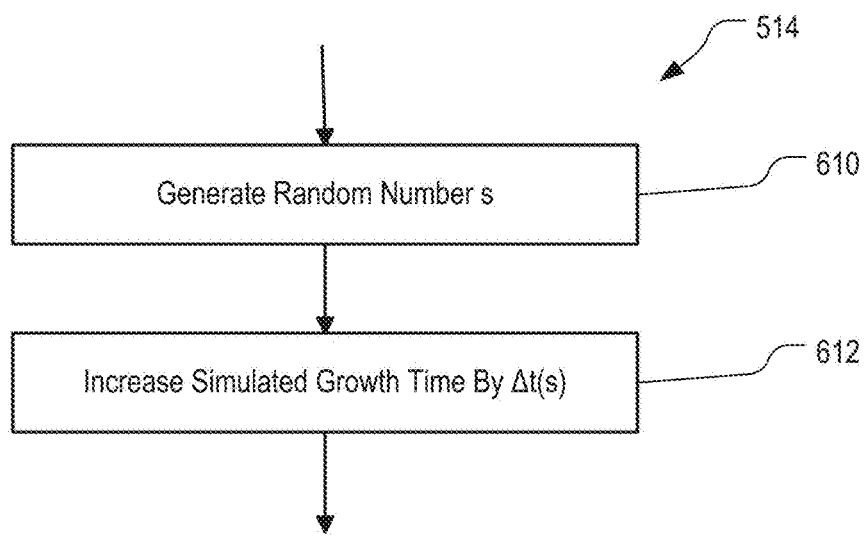
FIG. 6 is a flow chart detail of step 514 in FIG. 5 for increasing the total simulated growth time.

FIG. 5 is a flow chart detail of the iterating step 418 in FIG. 4 in one embodiment. Referring to FIG. 5, in step 510, based on the event frequencies, the iterating module 312 randomly chooses the next (enlarged) node in the (enlarged) lattice structure at which an event will occur, and the event type to occur at that node. More particularly, the next node and event type are chosen randomly, with probabilities that are weighted by the event frequency $v_{ik}$ currently associated with each of the nodes.

In step 512, iterating module 312 changes the state of the selected node according to the selected event type. For example, if node number 156 is to transition from "empty" to "silicon atom", then that transition is performed in step 512. In step 514, iterating module 312 increases the total simulated growth time. Step 512 is described in more detail in FIG. 6.

In step 516, iterating module 312 determines whether the iteration has completed. In various embodiments, this determination may be made on the basis of total simulated growth time, or total clock time, or growth volume, or ending event, or any other factor, all referred to herein as a "completion condition". If the iteration is done, then step 418 completes and the process continues at step 420 (FIG. 4). If not, then the iterating module 312 updates the event frequencies $v_{ik}$ at each node i, again using the Arrhenius function with prefactors determined in dependence upon the event type k, the neighbor nodes to node i, and possibly other factors as well. The iteration then returns to step 510 for the next pass.

FIG. 6 is a flow chart detail of step 514 in FIG. 5 for increasing the total simulated growth time. In one embodiment, the simulated growth time can always be incremented by a fixed interval $\Delta t=1/R_{PK}$, where $R_{PK}$ is the sum of all frequencies $v_{ik}$ at all nodes and all event types. However, the method in FIG. 6 is preferred. Referring to FIG. 6, in step 610, a random number 's' is generated. In step 612, the total simulated growth time is incremented by a function of s, preferably $$\Delta t = \frac{\ln\frac{1}{s}}{R_{PK}}.$$

Figure 7:
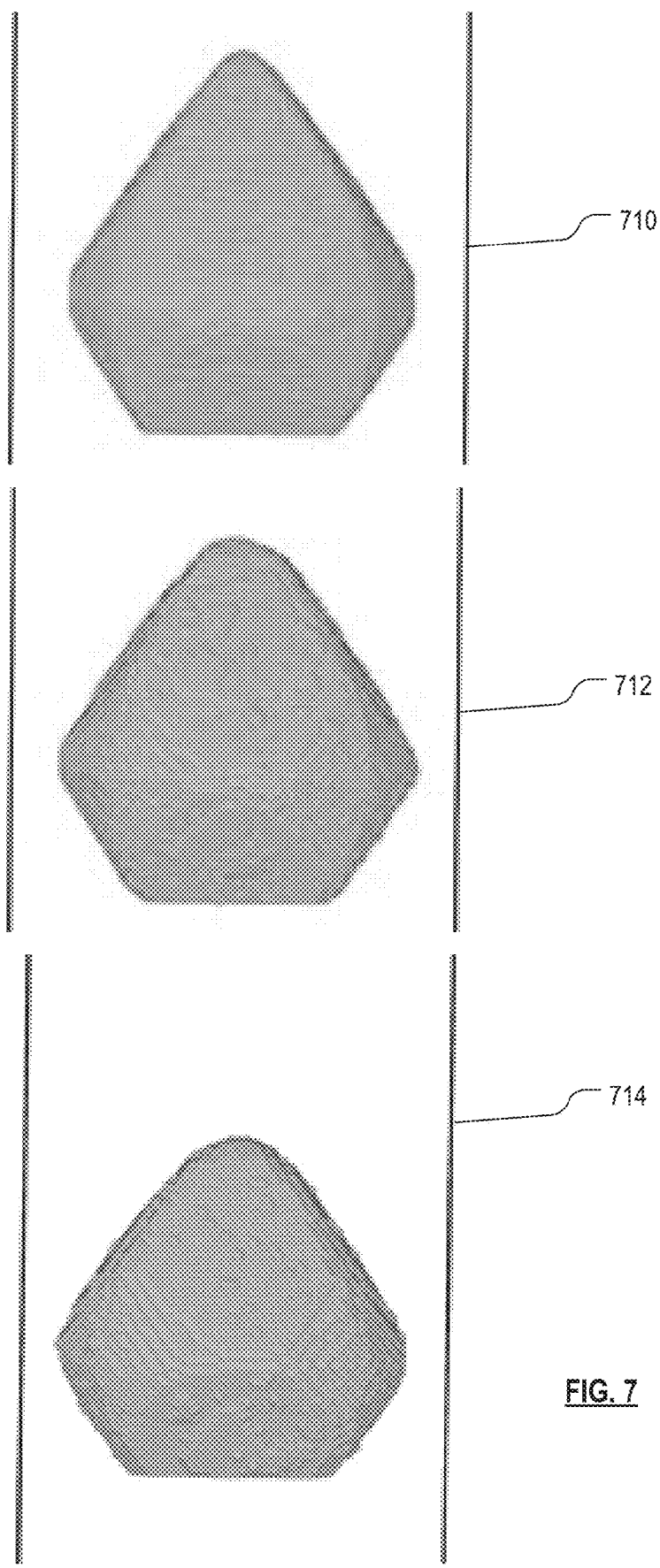
FIG. 7 illustrates simulated epitaxial growth results for different values of the lattice enlargement factor N.

FIG. 7 illustrates simulated epitaxial growth results for different values of the lattice enlargement factor N. Image 710 is a 3D rendering (visualization) illustrating the results of a growth process simulation without any enlargement (N=1). Image 712 illustrates the results when an enlargement factor N=2 is used, and image 714 illustrates the results when an enlargement factor of N=3 is used. It can be seen that the simulated resulting shape is roughly the same in all three examples, the only significant difference being the surface roughness. On the other hand, the simulation using N=2 is about eight times quicker to complete as the simulation using N=1, and the simulation using N=3 is about 27 times quicker to complete as the simulation using N=1.

Figure 8:
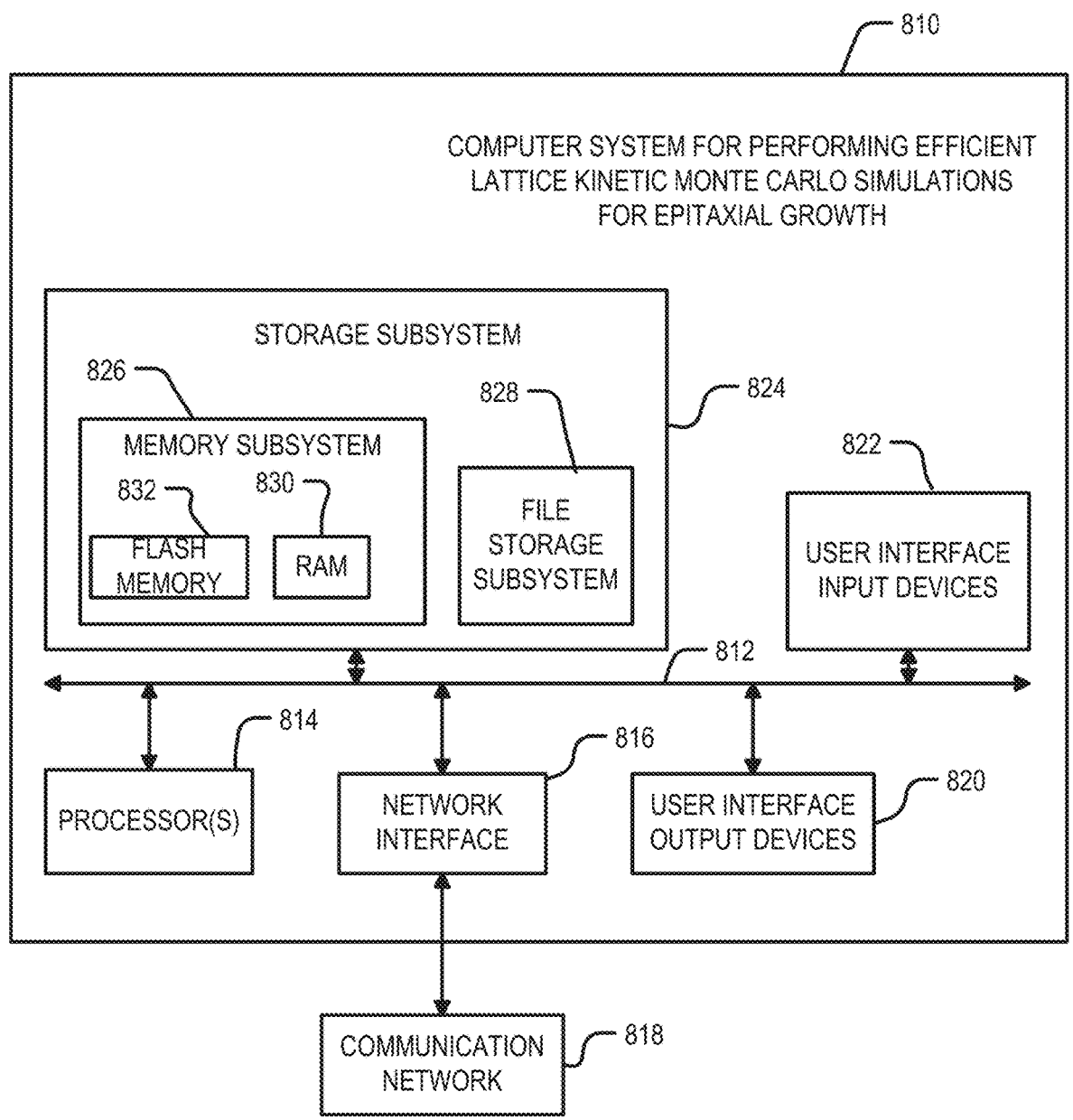
FIG. 8 is a simplified block diagram of a computer system 810 that can be used to implement software that performs efficient Lattice Kinetic Monte Carlo simulations as discussed herein.

FIG. 8 is a simplified block diagram of a computer system 810 that can be used to implement software that performs efficient Lattice Kinetic Monte Carlo simulations as discussed herein. While FIGS. 2, 3, 4, 5 and 6 indicate individual components as carrying out specified operations, it will be appreciated that each component actually causes the computer system 810 to operate in the specified manner.

Computer system 810 typically includes a processor subsystem 814 which communicates with a number of peripheral devices via bus subsystem 812. These peripheral devices may include a storage subsystem 824, comprising a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to communication network 818, and is coupled via communication network 818 to corresponding interface devices in other computer systems. Communication network 818 may comprise many interconnected computer systems and communication links. These communication links may be wireline links, optical links, wireless links, or any other mechanisms for communication of information, but typically it is an IP-based communication network. While in one embodiment, communication network 818 is the Internet, in other embodiments, communication network 818 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 822 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 810 or onto computer network 818.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores the basic programming and data constructs that provide the functionality of certain embodiments of the present invention. For example, the various modules implementing the functionality of certain embodiments of the invention may be stored in storage subsystem 824. These software modules are generally executed by processor subsystem 814.

Memory subsystem 826 typically includes a number of memories including a main random access memory (RAM) 830 for storage of instructions and data during program execution and a read only memory (ROM) 832 in which fixed instructions are stored. File storage subsystem 828 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 828. The host memory 826 contains, among other things, computer instructions which, when executed by the processor subsystem 814, cause the computer system to operate or perform functions as described herein. As used herein, processes and software that are said to run in or on "the host" or "the computer", execute on the processor subsystem 814 in response to computer instructions and data in the host memory subsystem 826 including any other local or remote storage for such instructions and data.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer system 810 itself can be of varying types including a personal computer, a portable computer, a workstation, a computer terminal, a network computer, a television, a mainframe, a server farm, or any other data processing system or user device. Due to the ever-changing nature of computers and networks, the description of computer system 810 depicted in FIG. 8 is intended only as a specific example for purposes of illustrating the preferred embodiments of the present invention. Many other configurations of computer system 810 are possible having more or less components than the computer system depicted in FIG. 8.

In an embodiment, software code portions for performing any of the functions described herein can be stored at one location, and the retrieved and transmitted to the location of a computer system that will be executing them. The transmission may take the form of writing the code portions onto a non-transitory computer readable medium and physically delivering the medium to the target computer system, or it may take the form of transmitting the code portions electronically, such as via the Internet, toward the target computer system. As used herein, electronic transmission "toward" a target computer system is complete when the transmission leaves the source properly addressed to the target computer system.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

As used herein, no distinction is intended between growth or etching "in" or "on" a predecessor body. No distinction is intended between the two words.

As used herein, exactness is considered a special case of an approximation. For example, a statement that A must be approximately equal to B is fully satisfied if A exactly equals B.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

As used herein, "Epitaxial growth" refers to the growth of an epitaxial layer in which the substrate acts as a seed crystal, and the epitaxial layer material orients into one of a defined set of discrete orientations with respect to the substrate crystal.

As used herein, "Epitaxial layer" refers to a crystalline layer formed on a crystalline substrate. In multilayer applications, the substrate may itself be an epitaxial layer.

References herein to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for simulating a process in a body, the body having a subject crystal lattice structure with a lattice constant $L_d$ in each of one or more dimensions d, comprising:

receiving an indication of a lattice enlargement factor N, N being greater than 1;

providing a data structure in a computer readable medium accessible to a computer system, the data structure representing an enlarged version of the subject crystal lattice structure having an enlarged lattice constant $N*L_d$ in each dimension d of the subject lattice structure, each vertex of the enlarged lattice structure being a lattice node;

assigning an initial state to each of the nodes i of the enlarged lattice structure, the initial states each being a member of a predefined finite list of at least two available states;

identifying for each combination of a node i of the enlarged lattice structure and a state transition type k, a respective initial frequency $v_{ik}$ by which a transition of type k is to occur from a current one of the states to a next one of the states at node i;

performing an iteration through a plurality of time steps in a simulation period, and at each time step executing a state transition of a selected one of the transition types at a selected one of the nodes, the selected node and the selected transition type being selected randomly as weighted by the frequencies $v_{ik}$;

determining whether a predefined completion condition of the iteration has occurred; and if the predefined completion condition of the iteration has not occurred, then updating the frequencies $v_{ik}$ in dependence upon the most recently executed state transition and continuing the iteration, and if the predefined completion condition of the iteration has occurred, then reporting for analysis or visualization a resulting simulated body structure in dependence upon the states of the nodes of the enlarged lattice structure after the most recent state transition executed during the iteration.

2. The method of claim 1, wherein the process to be simulated includes an epitaxial growth process, and wherein one of the available state transition types is a transition from a first state indicating that a particular node of the enlarged lattice structure is empty, to a second state indicating that the particular node is filled with an atom from an environment adjacent to the body according to the epitaxial growth process.

3. The method of claim 1, wherein the process to be simulated includes an epitaxial etch process, and wherein one of the available state transition types is a transition from a first state indicating that a particular node of the enlarged lattice structure is filled with an atom, to a second state indicating that the particular node is empty.

4. The method of claim 1, wherein the process to be simulated includes radioactive decay from a first state of a particle to a second state of the particle, wherein the events to be simulated include a transition from the first state of the particle to the second state of the particle, and wherein updating the frequencies $v_{ik}$ in dependence upon the most recently executed state transition comprises updating all the frequencies $v_{ik}$ in dependence upon the total number of nodes remaining in the enlarged lattice structure after the most recent transition from the first state of the particle to the second state of the particle.

5. The method of claim 1, wherein all dimensions d of the subject lattice structure have the same lattice constant L, and wherein all dimensions d of the enlarged lattice structure have the same lattice constant N*L.

6. The method of claim 1, wherein the process to be simulated includes an epitaxial process, and wherein identifying for each combination of a node i of the enlarged lattice structure and a state transition type k, a respective initial frequency $v_{ik}$, comprises, for each of the nodes i:

determining a configuration of states at nodes which are neighbors of node i of the enlarged lattice structure;

determining an Arrhenius function prefactor $v_{0ik}$, as approximately 1/N times the Arrhenius function prefactor that a sample node having the same configuration of states at nodes which are neighbors of the sample node in an un-enlarged lattice would have; and identifying the initial frequency $v_{ik}$ as $$v_{ik} = v_{0ik} \cdot \exp\left(\frac{-E_a}{k_B T}\right),$$

where $E_a$ is an activation energy, $k_B$ is Boltzmann's constant, and T is temperature.

7. The method of claim 6, wherein determining an Arrhenius function prefactor as approximately 1/N times the Arrhenius function prefactor that the sample node would have comprises determining the Arrhenius function prefactor $v_{0ik}$, as 1/N times the Arrhenius function prefactor that the sample node would have.

8. The method of claim 6, wherein the configuration of states at nodes which are neighbors of node i of the enlarged lattice structure identifies the configuration of states at only the first nearest neighbor nodes of node i of the enlarged lattice structure.

9. The method of claim 8, wherein the configuration of states at nodes which are neighbors of node i of the enlarged lattice structure identifies the configuration of states at the first, second and third nearest neighbor nodes of node i of the enlarged lattice structure.

10. The method of claim 6, wherein updating the frequencies $v_{ik}$ comprises, for a particular node i of the enlarged lattice structure and state transition type k:

determining the configuration of states at nodes which are neighbors of node i of the enlarged lattice structure;

determining the Arrhenius function prefactor $v_{0ik}$, as 1/N times the Arrhenius function prefactor that a sample node having the same configuration of states at nodes which are neighbors of the sample node in an un-enlarged lattice would have; and identifying the updated frequency $v_{ik}$ as $$v_{ik} = v_{0ik} \cdot \exp\left(\frac{-E_a}{k_B T}\right).$$

11. The method of claim 1, wherein the predefined completion condition is a member of the group consisting of:

total simulated growth time reaching a predefined maximum, total clock time reaching a predefined maximum, growth volume reaching a predefined maximum, and a predefined ending event.

12. The method of claim 1, wherein updating the frequencies $v_{ik}$ comprises, for a particular node i of the enlarged lattice structure and state transition type k:

determining the configuration of states at nodes which are neighbors of node i of the enlarged lattice structure;

determining an Arrhenius function prefactor $v_{0ik}$, as approximately 1/N times the Arrhenius function prefactor that a sample node having the same configuration of states at nodes which are neighbors of the sample node in an un-enlarged lattice would have; and identifying the updated frequency $v_{ik}$ as $$v_{ik} = v_{0ik} \cdot \exp\left(\frac{-E_a}{k_B T}\right),$$

where $E_a$ is an activation energy, $k_B$ is Boltzmann's constant, and T is temperature.

13. The method of claim 1, wherein the performing an iteration through a plurality of time steps in the simulation period further comprises, and at each of the time steps, increasing a total simulated process time by a particular amount.

14. The method of claim 13, wherein the process to be simulated includes an epitaxial process, and wherein increasing a total simulated process time by a particular amount comprises generating a random number s at each given one of the time steps, the particular amount for each given time step being given by $$\Delta t = \frac{\ln\frac{1}{s}}{R_{PK}},$$

where $R_{PK}$ is the sum of all frequencies $v_{ik}$ at all nodes in the enlarged lattice structure and all of the event types.

15. The method of claim 1, wherein reporting for visualization comprises delivering the states of the nodes of the enlarged lattice structure after the most recent state transition executed during the iteration toward a visualization module.

16. The method of claim 1, wherein reporting for analysis comprises:
reducing the enlarged lattice structure by a scale factor 1/N; and
delivering the states of the nodes of the reduced lattice structure toward an analysis module.

17. The method of claim 1, wherein reporting for analysis comprises:
converting the enlarged lattice structure to a regular mesh structure acceptable to an analysis module; and
delivering the regular mesh structure toward the analysis module.

18. The method of claim 1, further comprising performing the simulated epitaxial process on a physical crystalline body.

19. A system for simulating a process in a body, the body having a subject crystal lattice structure with a lattice constant Ld in each of one or more dimensions d, comprising a lattice construction module and an iterating module, each implemented in a computer system,
wherein the lattice construction module:
a receives an indication of a lattice enlargement factor N;
constructs a data structure in a computer readable medium accessible to the computer system, the data structure representing an enlarged version of the subject crystal lattice structure having an enlarged lattice constant $N*L_d$ in each dimension d of the subject lattice structure, each vertex of the enlarged lattice structure being a lattice node; and
assigns an initial state to each of the nodes i of the enlarged lattice structure, the initial states each being a member of a predefined finite list of at least two available states,
and wherein the iterating module:
identifies for each combination of a node i of the enlarged lattice structure and a state transition type k, a respective initial frequency $v_{ik}$ by which a transition of type k is to occur from a current one of the states to a next one of the states at node i;
performs an iteration through a plurality of time steps in a simulation period, and at each time step executing a state transition of a selected one of the transition types at a selected one of the nodes, the selected node and the selected transition type being selected randomly as weighted by the frequencies $v_{ik}$;
determines whether a predefined completion condition of the iteration has occurred; and
if the predefined completion condition of the iteration has not occurred, then updates the frequencies $v_{ik}$ in dependence upon the most recently executed state transition and continuing the iteration, and
if the predefined completion condition of the iteration has occurred, then reports for analysis or visualization a resulting simulated body structure in dependence upon the states of the nodes of the enlarged lattice structure after the most recent state transition executed during the iteration.

20. A computer readable medium, having stored thereon in a non-transitory manner, a plurality of software code portions defining logic for simulating a process in a body, the body having a subject crystal lattice structure with a lattice constant $L_d$ in each of one or more dimensions d, the method comprising:
receiving an indication of a lattice enlargement factor N, N being greater than 1;
constructing a data structure in a computer readable medium accessible to the computer system, the data structure representing an enlarged version of the subject crystal lattice structure having an enlarged lattice constant $N*L_d$ in each dimension d of the subject lattice structure, each vertex of the enlarged lattice structure being a lattice node;
assigning an initial state to each of the nodes i of the enlarged lattice structure, the initial states each being a member of a predefined finite list of at least two available states;
identifying for each combination of a node i of the enlarged lattice structure and a state transition type k, a respective initial frequency $v_{ik}$ by which a transition of type k is to occur from a current one of the states to a next one of the states at node i;
performing an iteration through a plurality of time steps in a simulation period, and at each time step executing a state transition of a selected one of the transition types at a selected one of the nodes, the selected node and the selected transition type being selected randomly as weighted by the frequencies $v_{ik}$;
determining whether a predefined completion condition of the iteration has occurred; and
if the predefined completion condition of the iteration has not occurred, then updating the frequencies $v_{ik}$ in dependence upon the most recently executed state transition and continuing the iteration, and
if the predefined completion condition of the iteration has occurred, then reporting for analysis or visualization a resulting simulated body structure in dependence upon the states of the nodes of the enlarged lattice structure after the most recent state transition executed during the iteration.

21. A system for simulating a process in a body, the body having a subject crystal lattice structure with a lattice constant Ld in each of one or more dimensions d, comprising:
means for receiving an indication of a lattice enlargement factor N;
means for constructing a data structure in a computer readable medium accessible to the computer system, the data structure representing an enlarged version of the subject crystal lattice structure having an enlarged lattice constant $N*L_d$ in each dimension d of the subject lattice structure, each vertex of the enlarged lattice structure being a lattice node;
means for assigning an initial state to each of the nodes i of the enlarged lattice structure, the initial states each being a member of a predefined finite list of at least two available states;

means for identifying for each combination of a node i of the enlarged lattice structure and a state transition type k, a respective initial frequency $v_{ik}$ by which a transition of type k is to occur from a current one of the states to a next one of the states at node i;

means for performing an iteration through a plurality of time steps in a simulation period, and at each time step executing a state transition of a selected one of the transition types at a selected one of the nodes, the selected node and the selected transition type being selected randomly as weighted by the frequencies $v_{ik}$;

means for determining whether a predefined completion condition of the iteration has occurred; and if the predefined completion condition of the iteration has not occurred, then updating the frequencies $v_{ik}$ in dependence upon the most recently executed state transition and continuing the iteration, and if the predefined completion condition of the iteration has occurred, then reporting for analysis or visualization a resulting simulated body structure in dependence upon the states of the nodes of the enlarged lattice structure after the most recent state transition executed during the iteration.

* * * * *